United States Patent [19]
Fujita Masanori et al.

[11] Patent Number: 5,164,763
[45] Date of Patent: Nov. 17, 1992

[54] INSTANT PHOTOCOPYING APPARATUS

[75] Inventors: Fujita Masanori; Tadahiko Yamaoka; Hiroshi Sudo, all of Tokyo, Japan

[73] Assignee: Seikosha Co., Ltd., Tokyo, Japan

[21] Appl. No.: 630,630

[22] Filed: Dec. 20, 1990

[30] Foreign Application Priority Data

Dec. 22, 1989 [JP] Japan .................. 1-333628

[51] Int. Cl.⁵ .............................................. G03B 27/52
[52] U.S. Cl. ...................................... 355/27; 355/50; 355/71
[58] Field of Search ............... 355/1, 21, 27, 50, 71, 355/72, 51; 354/182, 277, 275, 283, 284

[56] References Cited

U.S. PATENT DOCUMENTS 4,987,441  1/1991  Hudspeth .................. 355/50

Primary Examiner—Michael L. Gellner
Assistant Examiner—D. Rutledge
Attorney, Agent, or Firm—Jordan and Hamburg

[57] ABSTRACT

An instant photocopying apparatus includes a case placed on a document and a base plate formed with a window through which the document is visible and which is pivotably mounted on the case. An opening portion is formed in an upper surface of the case in superimposed positional relationship with the window. An instant photosensitive material is provided which has a photosensitive surface and a printing surface for forming an inverted image of an image formed on the photosensitive surface as a visible image. A cassette accommodates the instant photosensitive material, and a cassette holder is provided on an upper surface of the case and into which the cassette is chargeable. The case incorporates an optical device for forming a narrow region of the document on the photosensitive surface as an erecting real image, a driving arrangement for moving the optical means in parallel to the document, a light source for illuminating the document with light and a shading arrangement for preventing unnecessary light from falling on the photosensitive surface.

8 Claims, 9 Drawing Sheets

FIG.11

INSTANT PHOTOCOPYING APPARATUS

BACKGROUND OF THE INVENTION

This invention relates to a contact type copying apparatus for copying a document, an original picture, a photograph, and the like.

One conventional method of copying is effected by a camera in combination with a contact copying device.

Another type includes reading an image by a CCD or the like, and outputting the image data by means of a thermo-sensible printer.

In the former case, however, it is quite troublesome to set the camera, the contact copying device, and the magnitude of illumination. The quality of the copies material largely varies due to the influence of illumination. Magnification changes depend on the photographing distance, and it is difficult to provide uniform magnification over the entire surface due to lens aberration or the like. In addition, the apparatus is required to be of such a size as to adversely affect its operability.

In the latter case, the apparatus requires a reader unit and a printer unit. This results in an intricate configuration and imposes a large load on the circuit.

SUMMARY OF THE INVENTION

Accordingly, it is an object of the present invention to provide a simply constructed and easy-to-handle instant photocopying apparatus capable of obtaining copies of a high quality, which has a small size and which eliminates the necessity for a complicated circuit.

To achieve the above-mentioned objects, according to the present invention, there is provided an instant photocopying apparatus which comprises a case placed on a document; a base plate formed with a window through which the manuscript is visible and which is pivotably mounted on the case; an opening portion formed in an upper surface of the case in superimposed positional relationship with the window; an instant photosensitive material having a photosensitive surface and a printing surface for forming an inverted image of an image formed on the photosensitive surface as a visible image; a cassette for accommodating the instant photosensitive material; and a cassette holder provided on an upper surface of the case and into which the cassette is chargeable. The case incorporates an optical means for forming a narrow region of the document on the photosensitive surface as an erecting real image, a driving means for moving the optical means in parallel to the document, a light source for illuminating the document with light and a shading means for preventing unnecessary light from falling on the photosensitive surface.

Embodiments of the present invention will hereinafter be described in detail with reference to the accompanying drawings.

BRIEF DESCRIPTION OF THE DRAWINGS

FIGS. 1 to 7 in combination show one embodiment of the present invention;

FIGS. 9 through 11 in combination show another embodiment of this invention;

DESCRIPTION OF THE PREFERRED EMBODIMENTS

Figure 1:
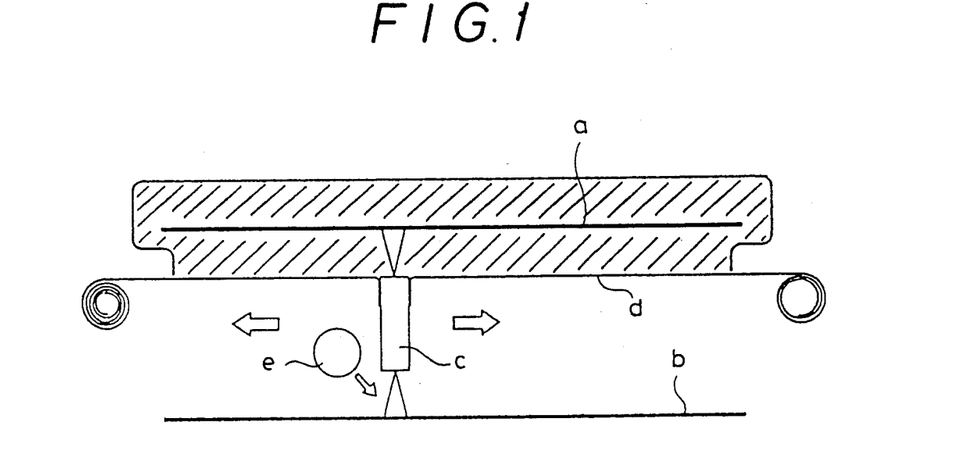
FIG. 1 is a diagram showing the principle of operation.

The description begins with a brief description of the principle of operation. As illustrated in FIG. 1, an instant photosensitive material (a) is disposed in parallel to the surface of a document (b). Interposed between the instant photosensitive material (a) and the document (b) is an optical means (c) for forming images of narrow band-like regions of the document (b) on the instant photosensitive material (a). The optical means (c) is shifted parallel to the surface of the document (b) by a shifting means (not illustrated). A light source (e) is provided for illuminating the document with the light source (e) being disposed between the instant photosensitive material (a) and the document (b). Hence, when shifting the optical means (c) from, e.g., the left end to the right end, images of the narrow regions of the document (b) are sequentially projected and formed on the instant photosensitive material (a) by the optical means (c). The document (b) is thus copied on the instant photosensitive material (a). A shading means (d) serves to shade the light other than the projection light from the optical means.

Figures 2, 5:
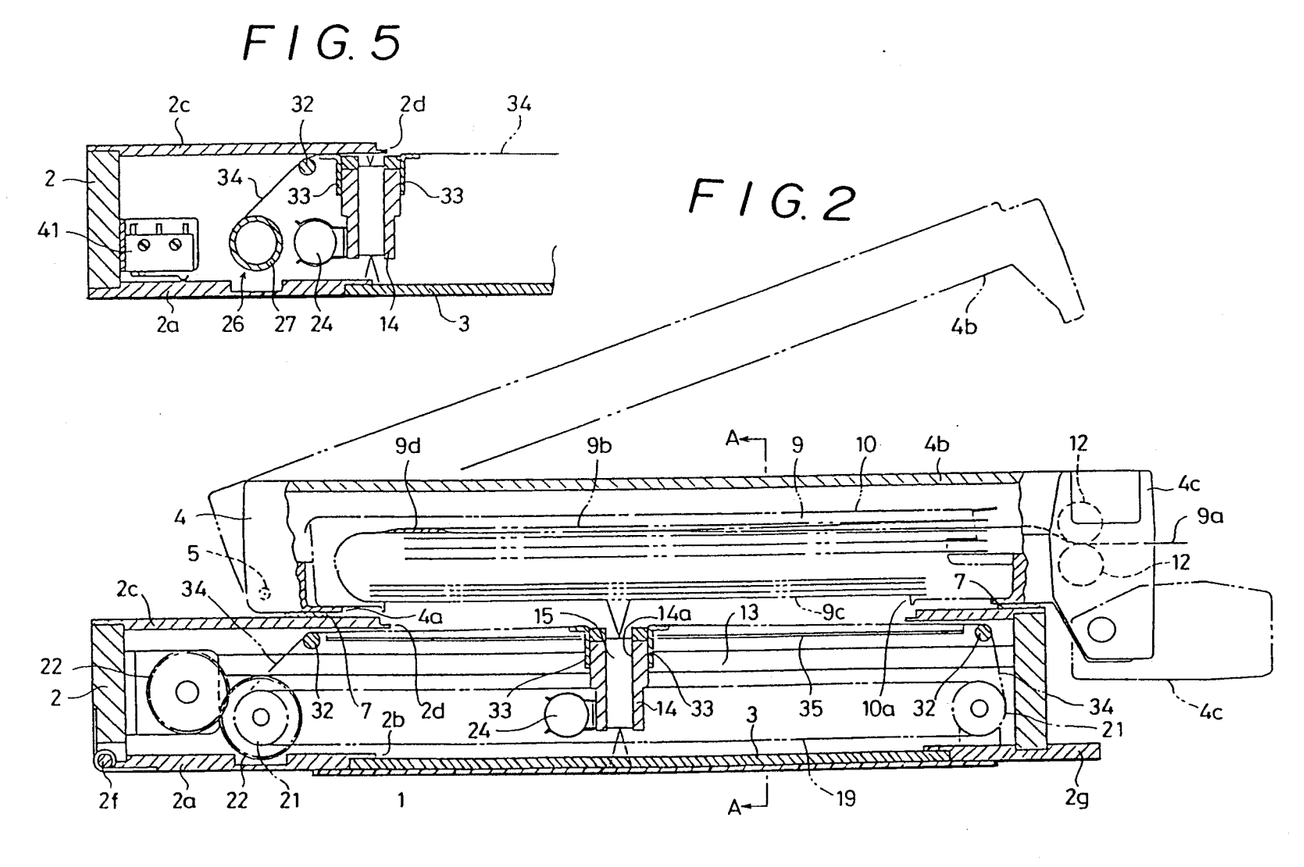
FIG. 2 is a partial sectional front elevational view.
FIG. 5 is a sectional view taken substantially along the line B—B of FIG. 3 showing an optical means in a standby status.
Figure 3:
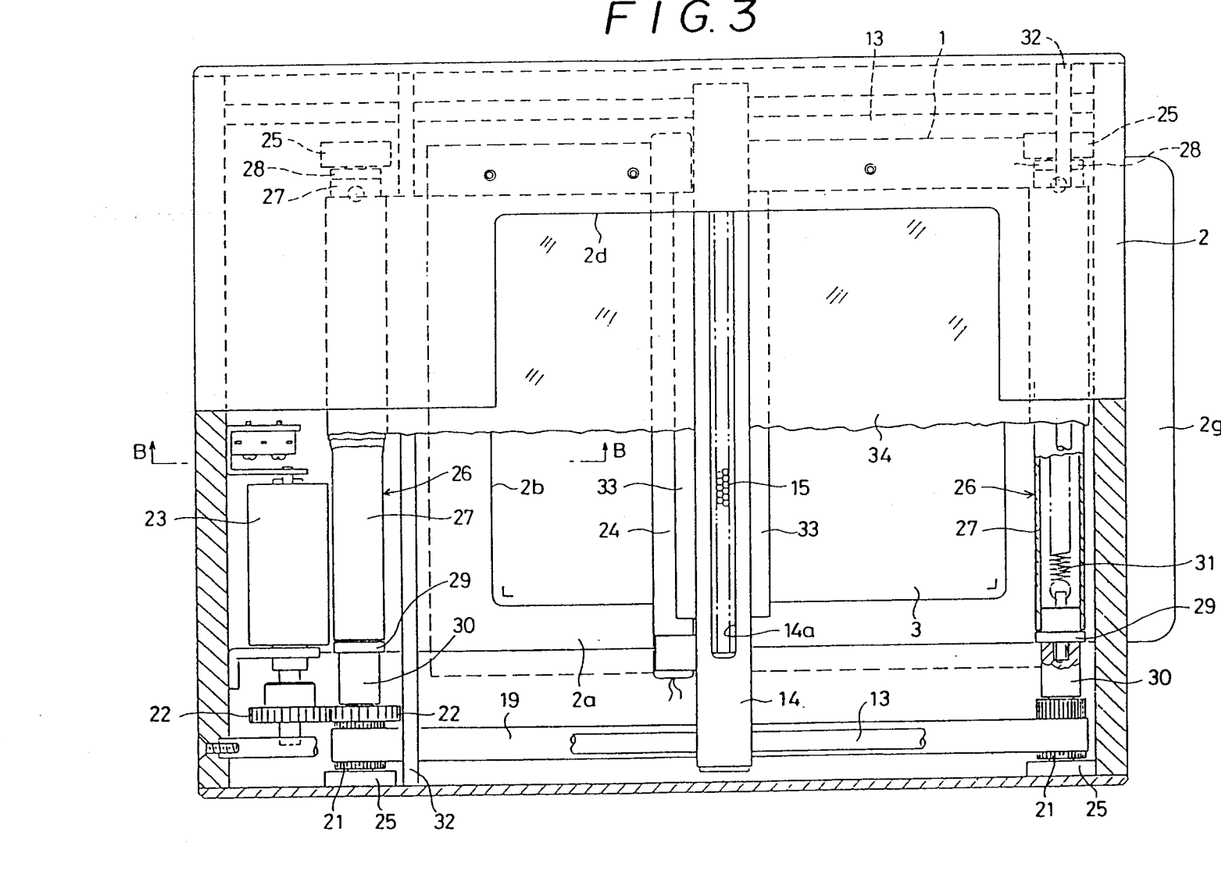
FIG. 3 is a plan view illustrating a case with some portions broken away.
Figure 4:
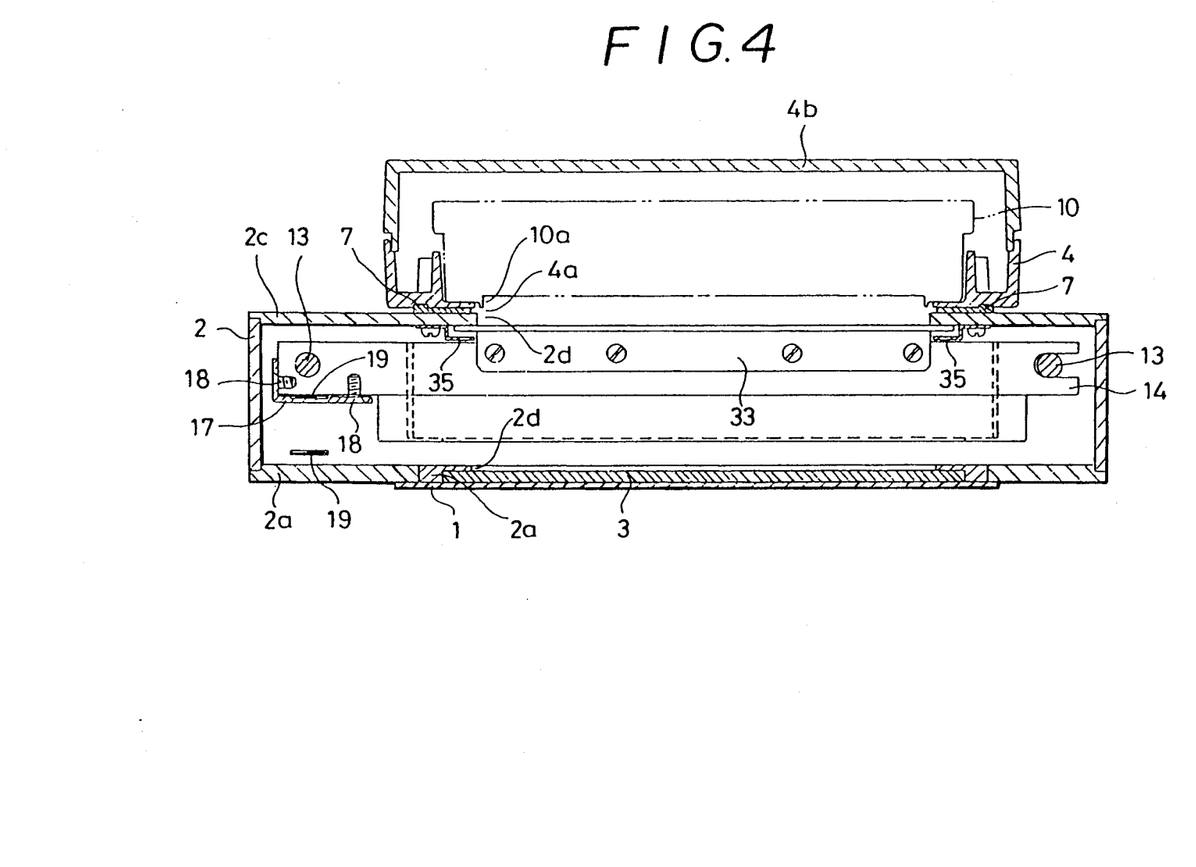
FIG. 4 is a sectional view taken substantially along the line A—A in FIG. 2.

As shown in FIGS. 2 through 4, a base plate 2a of a case 2 is placed on the document 1. The base plate 2a is mounted to be pivotable relative to the case body by a hinge 2f at the left end in FIG. 2, thus forming a document presser member. A central part of the base plate 2a has an opening forming a window 2b through which the document (a) is visible. Fixed in the window 2b is a transparent plate 3 made of glass or an acrylic resin, a lower surface of which is flush with a lower surface of the base plate 2a. The right end of the base plate 2a protrudes from the case body to form a projection 2g. An opening 2d is formed in an upper plate 2c of the case 2 so as to confront the window 2b. As shown in FIGS. 3 and 5, a malfunction preventing switch 41 is provided in a left side part within the case 2. The malfunction preventing switch 41 is set directly as, e.g., a main switch or a switch connected in series to the main switch. A mistake in switching with the base plate 2a opened is thereby prevented.

A window 4a is formed in a lower surface of a cassette holder 4. The cassette holder 4 is fixed via a spacer 7 to the case 2 so that the window 4a confronts the opening portion 2d. The cassette holder 4 is provided with an upper cover 4b for taking in and out a film cassette. The upper cover 4b is supported on the left end portion of the body of the cassette holder 4 as to be pivotable about a pivot 5. A locking arm 4c is attached to the right end of the body of the cassette holder 4 to provide a lock in a state where the upper cover 4b is closed.

A cassette 10 accommodates a plurality of exfoliation instant films (instant photosensitive materials) 9. The cassette 10 is disposed in the cassette holder 4. A rear end of a pull-out tongue member 9a of the instant film 9 is forked. Fixed to both ends of the forked parts are a printing film (printing surface) 9b and a photosensitive film (photosensitive surface) 9c which confront each other. One of the forked parts is fitted with a bag containing a developing agent 9d. The cassette 10 houses the instant films 9 folded therein. The lowermost photosensitive film 9c is observable through the window 10a open to the lower surface of the cassette 10. When the cassette 10 is disposed in the holder 4, the photosensitive film 9c confronts the window 2b parallel to the base plate 2a. The instant film 9 is pulled out by passing the pull-out tongue member 9a between a pair of rollers 12, 12 secured to the cassette holder 4. As a consequence, the bag containing the developing agent is ruptured to spread between the printing film 9b and the photosensitive film 9c. Developing and fixing are thus effected.

Next, as shown in FIGS. 2 to 4, a pair of guide shafts 13 are provided in parallel to the bottom face of the case 2 at both ends within the case 2. The two guide shafts 13 pass through U-shaped grooves or through-holes formed in both end portions of a carrier 14. With this arrangement, the carrier 14 is guided by the guide shafts 13 and movable in parallel to the document 1.

An elongated groove 14a is provided in the central part of the carrier 14. Held in the elongated groove 14a is a rod lens array (optical means) 15 (e.g., a selfoc lens array which is a brand name). The rod lens array 15 is arranged to form images by beams of light coming from the narrow band-like regions of the document 1 with an erecting equi-magnification, the document 1 contacting the lower surface of the transparent plate 3. Fixed to the carrier 14 at the left end as shown in FIG. 4 is a part of an endless timing belt 19 with a retainer 17 and a screw 18. The timing belt 19 is wound on pulleys 21 axially supported on bearings 25 which will be described later. The pulleys 21 rotate interlocking with rotation of a driving motor 23 serving as a part of driving means which also includes a gear train 22 mounted in the case 2. The carrier 14 can be reciprocated by causing forward and reverse rotation of the driving motor 23. The case 2 incorporates a limit switch (not illustrated) for regulating the moving range of the carrier 14.

The carrier 14 is fitted with a light source 24. The light source involves the use of a fluorescent lamp. A non-illustrated mask is formed with a slit-like aperture. The mask is fixed onto an outer periphery of the fluorescent lamp in a position facing the document surface under the rod lens array 15. With this arrangement, illuminance of the narrow regions of the document to be copied increases.

Bearings 25 are provided in the upper and lower positions of the right and left side portions as shown in FIG. 3. A winding means 26 of a shading film (shading means) 34 is rotatably supported on the bearing members 25. More specifically, the winding means 26 is constructed such that a shaft 28 is fixed to one end of a winding pipe 27, while a shaft 29 is loosely rotatably fitted to the other end thereof. Connected between the shafts 28 and 29 in an interior of the winding pipe 27 is a coil spring 31 would up a given amount to impart a tensile force to the shading film 34. The shaft 29 is fixed via an elongated rod 30 to the pulley 21

As shown in FIGS. 2 and 3, a pair of shading film guides 32, 32 are provided in parallel to the carrier 14 at a spacing wider than a confronting edge of the opening portion 2d. The shading film guides 32, 32 are fixed to the winding pipe 27, 27; and the other ends thereof are fixed via an angled plate to the carrier 14. Considering the moving range of the carrier 14, the winding means 26, 26 are wound with predetermined extra turns of the shading film 34. In a mounting state, the coil spring 31 imparts a counterclockwise rotating force to the left winding pipe 27 illustrated in FIG. 5, while the right winding pipe receives a clockwise rotating force. As a result, the shading film 34 acts to shade the photosensitive film 9c except for the projection part of the rod lens array 15. When the carrier 14 is positioned at the left or right end illustrated in FIG. 5 so as to assume a standby status, the projection part of the rod lens array 15 deviates from the opening portion 2d. Thus, the entire surface of the photo sensitive film 9c is shaded by the shading film 34.

The following is a description of the operation.

Figure 6:
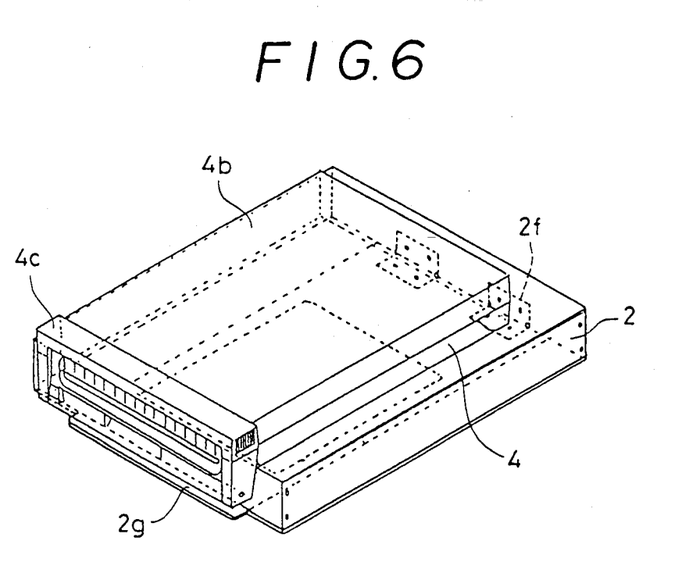
FIG. 6 is a perspective view illustrating a state where the case is closed.
Figure 7:
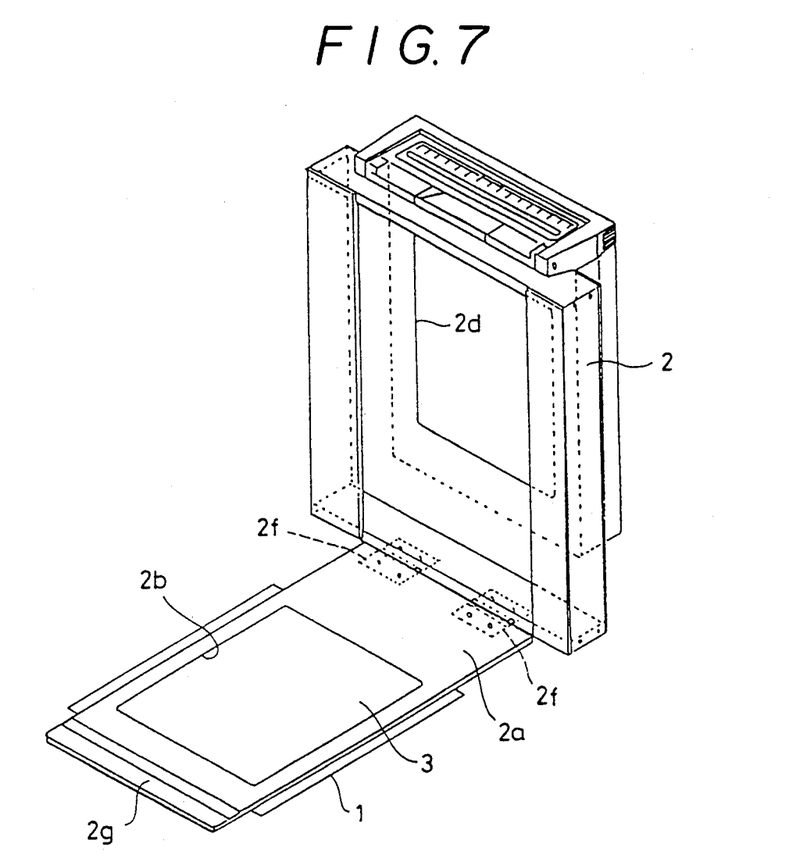
FIG. 7 is a perspective view showing a state where the case is opened.

The instant photocopying apparatus is placed on the document 1 (FIG. 6). The case 2 is, as shown in FIG. 7, opened by holding the projection portion 2g of the base plate 2a with the fingers. The part to be photographed is aligned with the window 2b. Thereafter, the case 2 is closed (FIG. 6) and the document surface is parallel to the photosensitive film 9c, with the result that the document surface and the film 9c are spaced opposite to each other at an image-forming focal distance of the rod lens array 15.

A power supply switch (not illustrated) of the apparatus is turned ON. The fluorescent lamp 24 is thereby lit up. The lower part of the rod lens array 15 is illuminated with the light. When depressing a start switch (not shown), the driving motor 23 starts. The carrier 14 moves forward from, e.g., a standby position at the left end towards the right direction with the aid of the gear train 22, the pulley 21 and the timing belt 19. With the movement of the carrier 14, beams of reflection light from the document surface 1 are sequentially incident on the rod lens array 15. As a result, latent images are formed on the photosensitive film 9c. With the rightward movement of the carrier 14, the shading film 34 is pulled out from the winding means 26. At the same moment, the shading film 34 is wound on the right winding means 26. The shading film 34 is kept in a shading state without being slackened due to the action of the coil spring 31. When the latent images are formed on the entire surface of the photosensitive film 9c after the carrier 14 has reached the right end position, the limit switch operates and the carrier 14 stops, thus finishing one operation.

Thereafter, the pull-out tongue member 9a of the instant film is pulled. The developing agent 9d is applied between the printing film 9b and the photosensitive film 9c to adhere them together. The developing is completed in, e.g., approximately one minute.

Figure 8:
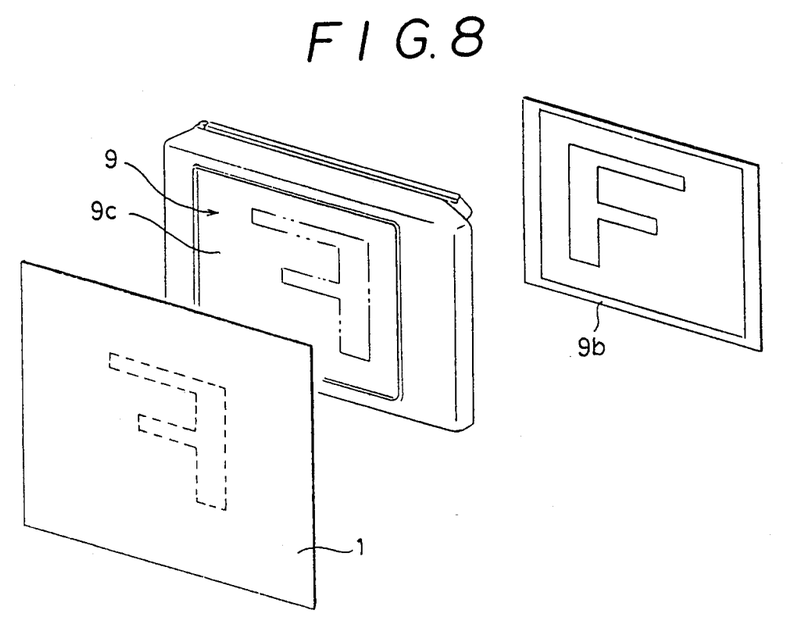
FIG. 8 is a diagram showing a copying process.

The instant photosensitive material applicable to the present invention is classified into an exfoliation type and a mono-sheet type. In the case of the exfoliation type instant photosensitive material shown in FIG. 8, it is assumed that the document 1 is, for instance, the letter F. A mirror inverted image of F is formed as a latent image on the photosensitive film 9c of the instant film 9 by the optical means. This photosensitive film is pulled and developed. It follows that this inverted image is further inverted. Formed on the printing film 9b is a visible image F wherein the latent image is inverted.

Next, when copying other material, the case 2 is opened, and the part to be copied is aligned through the window 2b in the same procedure as described above. Subsequently, the case 2 is closed, and the start switch is depressed once again. The carrier 14 moves forward from the right end position to the left end position, whereby copying is effected.

In the embodiment discussed above, the cassette holder 4 is fixed to the case 2, and the cassette holder is pivotably mounted on the upper surface of the case. A film cassette may be fitted from the underside of the cassette holder by rotating the holder.

In the embodiment described above, the opening portion 2d of the case 2 is shaded by use of the shading film 34. Alternatively, a bellows or the like may be employed as the shading means. The transparent plate 3 is fixed to the window 2b of the base plate 2a of the case 2. However, the window 2b may remain open. In addition, this embodiment can be modified in various forms within the scope of the invention without departing from the technical idea of the present invention.

Figure 9:
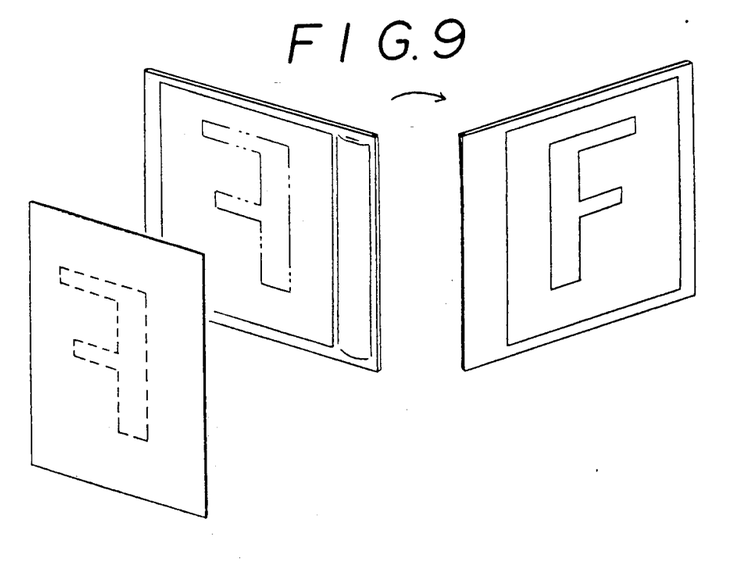
FIG. 9 is a diagram showing a copying process of this other embodiment.

This invention is also applicable to a mono-sheet instant film illustrated in FIG. 9. The mono-sheet instant film has one surface serving as a photosensitive surface. A latent image obtained by inverting the document is formed on the photosensitive surface by the optical means. After undergoing the developing process, an inverted visible image is formed on the other surface.

Another embodiment of the invention will now be described in detail with reference to the accompanying drawings.

Figure 10:
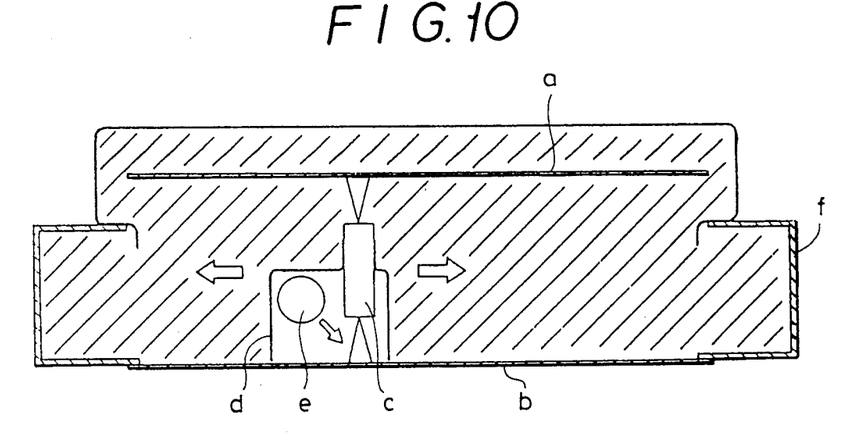
FIG. 10 is a diagram showing the principle of operation.

The explanation begins with a brief description of the principle of operation. Except for the construction of the shading means, the configuration is virtually the same as that of the first embodiment. Namely, as shown in FIG. 10, only a document (b) vicinal to an optical means (c) is irradiated with a beam of a light source (e). A shading means (d) for preventing beam leakage to the periphery is provided integrally with the optical means (c). Outside beams and the beams emerging from the light source (e) are prevented from reaching the instant photosensitive material (a) by a case (f) and a shading means (d). Thus, the instant photosensitive material (a) is prevented from being sensitized.

Next, the apparatus will be specifically explained.

Except for the construction of the shading means and the provision of the shading plate, the configuration is the same as the first embodiment. Throughout the drawings, virtually the same components as those in the first embodiment are marked with the same numerals to which 100 has been added.

Figure 11:
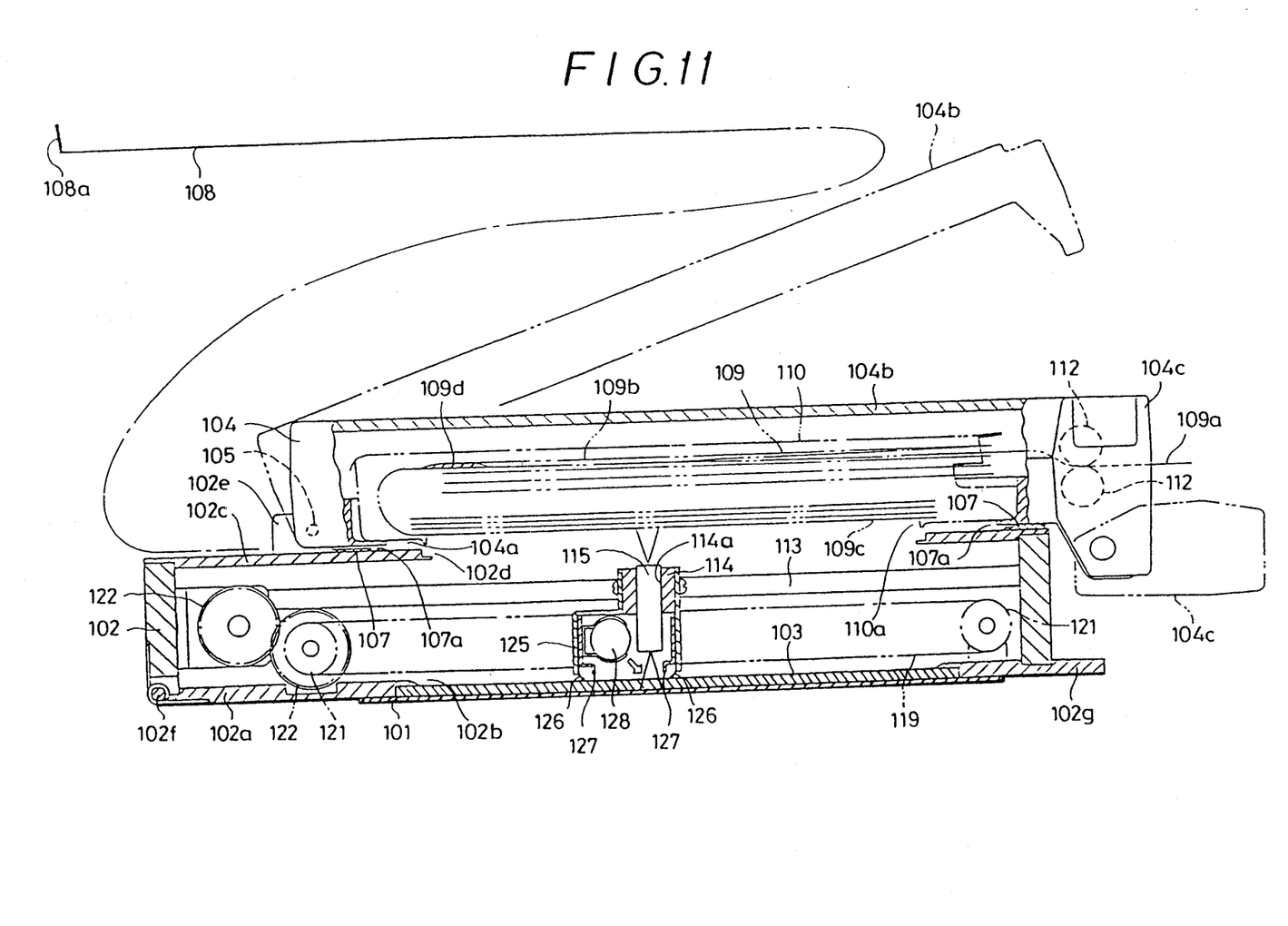
FIG. 11 is a partial sectional front view.

As shown in FIG. 11, a groove 107a is provided in a part of a connector 107 so that a shading plate 108 is insertable from the left in FIG. 11. The shading plate 108 is made of stainless plate and has a width (not shown) and a length enough to permit the insertion from the groove 107a and shade an aperture 104a. A left end of the shading plate 108 is bent upwards, thus forming a handle portion 108a used for pull-out from the groove 107a.

An elongated groove 114a is provided in the central part of the carrier 114. Held in the elongated groove 114a is a rod lens array (optical means) 115 (e.g., a selfoc lens array which is a brand name). A projection range of the rod lens array is determined as in an ordinary lens. The rod lens array operates to form an image by means of a predetermined range of the document on a photosensitive film 109a with an erecting equi-magnification, the lower surface of the transparent plate 103 contacting the document.

Attached to the carrier 114 is a shading housing 125 defined as a shading means for preventing leakage of light from the light source, which will be described later, to the periphery and providing illumination only in a lower direction. The shading housing 125 is composed of a material adaptive to shield the light. The housing 125 has a length slightly larger than a window 102b. The housing 125 also has a width, as shown in FIG. 11, having a section on the left side to mount a light source 128. A lower end surface of the housing 125 extends to a position close to the upper surface of the base plate 102a. A brush-like elastic rubber 126 is fitted to a inner peripheral surface of the shading housing 125 by use of a press plate 127 which presses the rubber 126 form inside. A lower part of the brush-like elastic rubber 126 contacts a transparent acrylic plate 103, whereby the leakage of light from the lower end of the shading housing 125 is prevented by the brush-like elastic rubber 126. The light source 128 is attached to the press plate 127 provided on the left side of FIG. 11.

The operation will now be described. The shading plate 108 is inserted in the groove 107a of the connector 107, thereby preventing the light from entering the interior of a cassette holder 104. A document 101 to be copied faces upwardly, and the apparatus of this invention is placed thereon. A case 102 is opened in the same manner of FIG. 7 by holding a projection portion 102g of a base plate 102a with the fingers. The part to be photographed is aligned with a window 102b. Thereafter, the case 102 is closed. The document 101 is parallel to a photosensitive film 109c. The document 101 and the film 109c are spaced opposite to each other at an image-forming focal distance of the rod lens array 115.

The power supply switch of this apparatus is turned ON by pulling the shading plate 108. Copying is performed in the same way as in the first embodiment. If, for example, color film copying is changed to white-and-black film copying, the shading plate 108 is inserted in the groove 107a of the connector 107. The light is thus prevented from entering the interior of the cassette holder 104. The whole cassette holder 104 is then pulled out of the case 102. Next, the cassette holder charged with the white-and-black film is set in the case 102, and the cassette holder is thus replaced.

The cassette holder 104 is pivotably mounted on an upper surface of the case 102. When positioning on the document, the cassette holder 104 is pivotably raised. The document 101 has an upwardly facing surface which is to be copied. The position of the document 101 is confirmed while observing through the window 102b and the opening portion 102d so that the part of the document 101 to be copied is located in the window 102b. The case 102 may be placed directly on the document 101.

The transparent plate 103 is fixed to the window 102b formed in the lower surface of the case 102. The window 102b may remain open. In addition, this embodiment may be modified in various forms within a range which does not depart from the technical idea of the present invention.

In the instant photocopying apparatus of this invention, the instant photosensitive material is disposed parallel to the document surface. The image of the document is formed directly on the photosensitive surface of the material by the optical means moving parallel to the document surface. As compared with the case of a temporary conversion into electric signals, the necessity for a complicated circuit is eliminated, and the construction is extremely simple. It is therefore possible to provide a small-sized handy apparatus. In the case of employing a close-copying device, a complicated adjustment of mounting the close-copying device becomes unnecessary. This facilitates the copying operation. The copying operations on the photosensitive surface are sequentially carried out while moving the optical means along the document surface. It is feasible to obtain the copied material with a uniform magnification over the entire instant photosensitive material surface.

The base plate is formed with the window through which the document is visible. The base plate is pivotably connected to the case. Therefore, it is possible to easily confirm the position of the copied material through the window while in the open state on the case.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

What we claims is:

1. An instant photocopying apparatus for copying copy material comprising:
   a case means having a window and an opening in superimposed relationship with said window;
   a cassette means mounted on said case means,
   photosensitive material means in said cassette means and disposed in superimposed relationship to said opening and said window, said photosensitive material means having a photosensitive surface and a printing surface for forming a visible image of an image formed on said photosensitive surface;
   optical means in said case means for forming a narrow portion of said copy material as an image on said photosensitive surface of said photosensitive material means;
   shade means for preventing undesired light from falling on said photosensitive material means, said shade means comprising a shade plate which is slidably mounted on said cassette means and which is slidably removable and insertable on said cassette means; and
   driving means for moving said optical means parallel to said copy material such that said optical means is thereby operable to effect imaging of a plurality of incremental portions of said copy material on said photosensitive surface and said photosensitive material means is thereby operable to produce a copy of said copy material.

2. An instant photocopying apparatus according to claim 1, wherein said window comprises a flat transparent material, said optical means mounting flexible shade elements biased against said flat transparent material and which biasingly slide on said flat transparent material as said optical means is moved by said drive means.

3. An instant photocopying apparatus according to claim 1, wherein said cassette means comprises a cassette holder and a film cassette removably received in said cassette holder, said cassette holder being mounted on said case means, said film cassette accommodating a plurality of said photosensitive material means.

4. An instant photocopying apparatus according to claim 1; wherein cassette means has an opening disposed in superimposed relationship with said opening in said case means.

5. An instant photocopying apparatus according to claim 1, wherein said cassette means comprises a cassette body and a cover pivotably mounted on said cassette body for providing access to said photosensitive material means within said cassette body.

6. An instant photocopying apparatus for copying copy material comprising:
   a case having a window and an opening in superimposed relationship with said window;
   said case means comprising a casing housing, said window comprising a window means pivotably mounted on said casing housing, said window means having one pivotable position in which said window is disposed in superimposed relationship with said copy material while said casing housing is displaced from superimposed relationship with said copy material to provide for viewing of said copy material through said window means, said window means having another pivotable position in which said window means is disposed in superimposed relationship with said casing housing;
   a cassette means mounted on said case means;
   photosensitive material means in said cassette means and disposed in superimposed relationship to said opening and said window, said photosensitive material means having a photosensitive surface and a printing surface for forming a visible image of an image formed on said photosensitive surface;
   optical means in said case means for forming a narrow portion of said copy material as an image on said photosensitive surface of said photosensitive material means;
   said optical means comprising shade means for preventing undesired light from falling on said photosensitive material means; and
   driving means for moving said optical means parallel to said copy material such that said optical means is thereby operable to effect imaging of a plurality of incremental portions of said copy material on said photosensitive surface and said photosensitive material means is thereby operable to produce a copy of said copy material.

7. An instant photocopying apparatus for copying copy material comprising:
   a case means having a window and an opening in superimposed relationship with said window;
   a cassette means pivotably mounted on said case means;
   photosensitive material means in said cassette means and disposed in superimposed relationship to said opening and said window, said photosensitive material means having a photosensitive surface and a printing surface for forming a visible image of an image formed on said photosensitive surface;
   optical means in said case means for forming a narrow portion of said copy material as an image on said photosensitive surface of said photosensitive material means;
   shade means for preventing undesired light from falling on said photosensitive material means, said shade means comprising a shade plate which is slidably mounted on said cassette means and which is slidably removable and insertable on said cassette means; and driving means for moving said optical means parallel to said copy material such that said optical means is thereby operable to effect imaging of a plurality of incremental portions of said copy material on said photosensitive surface and said photosensitive material means is thereby operable to produce a copy of said copy material.

8. An instant photocopying apparatus for copying copy material comprising:
 a case means having a window and an opening in superimposed relationship with said window, said window comprising a flat transparent material;
 a cassette means mounted on said case means;
 photosensitive material means in said cassette means and disposed in superimposed relationship to said opening and said window, said photosensitive material means having a photosensitive surface and a printing surface for forming a visible image of an image formed on said photosensitive surface;
 optical means in said case means for forming a narrow portion of said copy material as an image on said photosensitive surface of said photosensitive material means;
 said optical means mounting flexible shade elements biased against said flat transparent material and which biasingly slide on said flat transparent material as said optical means is moved; and
 driving means for moving said optical means parallel to said copy material such that said optical means is thereby operable to effect imaging of a plurality of incremental portions of said copy material on said photosensitive surface and said photosensitive material means is thereby operable to produce a copy of said copy material.

* * * * *